(12) United States Patent
Miller et al.

(10) Patent No.: US 10,733,222 B1
(45) Date of Patent: Aug. 4, 2020

(54) PROFILE DISAMBIGUATION

(71) Applicant: Amazon Technologies, Inc., Seattle, WA (US)

(72) Inventors: Rebecca Joy Lopdrup Miller, Seattle, WA (US); Dick Clarence Hardt, Seattle, WA (US); Joseph Jessup, Seattle, WA (US); Yu Bao, Issaquah, WA (US); Gonzalo Alvarez Barrio, Seattle, WA (US); Liron Torres, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 15/997,068

(22) Filed: Jun. 4, 2018

(51) Int. Cl.
*G06F 16/335* (2019.01)
*G10L 15/26* (2006.01)
(Continued)

(52) U.S. Cl.
CPC ............ *G06F 16/335* (2019.01); *G10L 15/18* (2013.01); *G10L 15/26* (2013.01); *G10L 17/06* (2013.01)

(58) Field of Classification Search
CPC ......... G10L 15/22; G10L 15/26; G10L 15/30; G10L 2015/223; G10L 13/043; G10L 15/005; G10L 15/07; G10L 15/08; G10L 15/14; G10L 15/1822; G10L 15/19; G10L 15/32; G10L 17/22; G10L 2015/088; G10L 2015/226; G10L 2015/228; G10L 25/57; G10L 15/1815; G10L 15/18; G10L 15/02; G10L 15/063; G10L 15/28; G10L 2015/225; G10L 25/51; G10L 25/84; G10L 15/16; G10L 17/00; G10L 99/00; G10L 13/00; G10L 13/02; G10L 15/00; G10L 15/24; G10L 15/265; G10L 17/005; G10L 17/04; G10L 17/06; G10L 17/08; G10L 2015/0635; G10L 2015/221; G10L 2021/0282; G10L 21/0208; G06F 2221/2111; G06F 9/4451; G06F 16/3331; G06F 16/90332; G06F 16/90335; G06F 17/2785; G06F 8/38; G06F 40/268; G06F 40/30; G06F 40/284; G06F 40/44;
(Continued)

(56) References Cited

U.S. PATENT DOCUMENTS

2018/0075251 A1\* 3/2018 Van Hoof ........... G06F 21/6227
2018/0077277 A1\* 3/2018 Abraham ................ H04L 63/10
2019/0318729 A1\* 10/2019 Chao ...................... G10L 15/08

\* cited by examiner

*Primary Examiner* — Huyen X Vo
(74) *Attorney, Agent, or Firm* — Pierce Atwood LLP

(57) ABSTRACT

Techniques for disambiguating which profile, of multiple profiles, is to be used to respond to a user input are described. A device located in a communal space (e.g., a hotel room or suite of rooms, conference room, hospital room, etc.) may be associated with a device profile and a user profile of a user presently occupying the communal space. When the user inputs a command to the device (either by text or speech), a system associated with the device determines the profiles (e.g., a device profile and a user profile) associated with the device. The system determines one or more policies associated with the device. The one or more policies may correspond to rules for disambiguating which profile to use to execute with respect to the user input. Using the one or more policies, the system determines which profile is to be used, and causes a speechlet component to execute using information specific to the determined profile.

21 Claims, 10 Drawing Sheets

(51) Int. Cl.
*G10L 15/18* (2013.01)
*G10L 17/06* (2013.01)

(58) Field of Classification Search
CPC ........ G06F 40/56; G06F 3/167; G06F 40/211; G06F 16/3329; G06F 40/20; G06F 40/205; G06F 8/425; G06F 8/427; G06F 16/3334; G06F 16/3344; G06F 16/433; G06F 16/435; G06F 16/735; G06F 2221/2117
See application file for complete search history.

FIG. 5

| Device profile identifier | User profile identifier | Indicator of when linkage is to be deleted |
|---|---|---|
| 1234 | 2345 | May 1 |
| 3456 | 4567 | Tuesday, May 1 |
| 5678 | 6789 | May 1 at 11am (EST) |
| 7890 | 8901 | <Null> |

PROFILE DISAMBIGUATION

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of a computing device to perform tasks based on the user's spoken commands. The combination of speech recognition processing and natural language understanding processing techniques is referred to herein as speech processing. Speech processing may also involve converting a user's speech into text data which may then be provided to speechlets.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 5 is a conceptual diagram of data stored in a linked profiles storage according to embodiments of the present disclosure.

DETAILED DESCRIPTION

Figure 1:
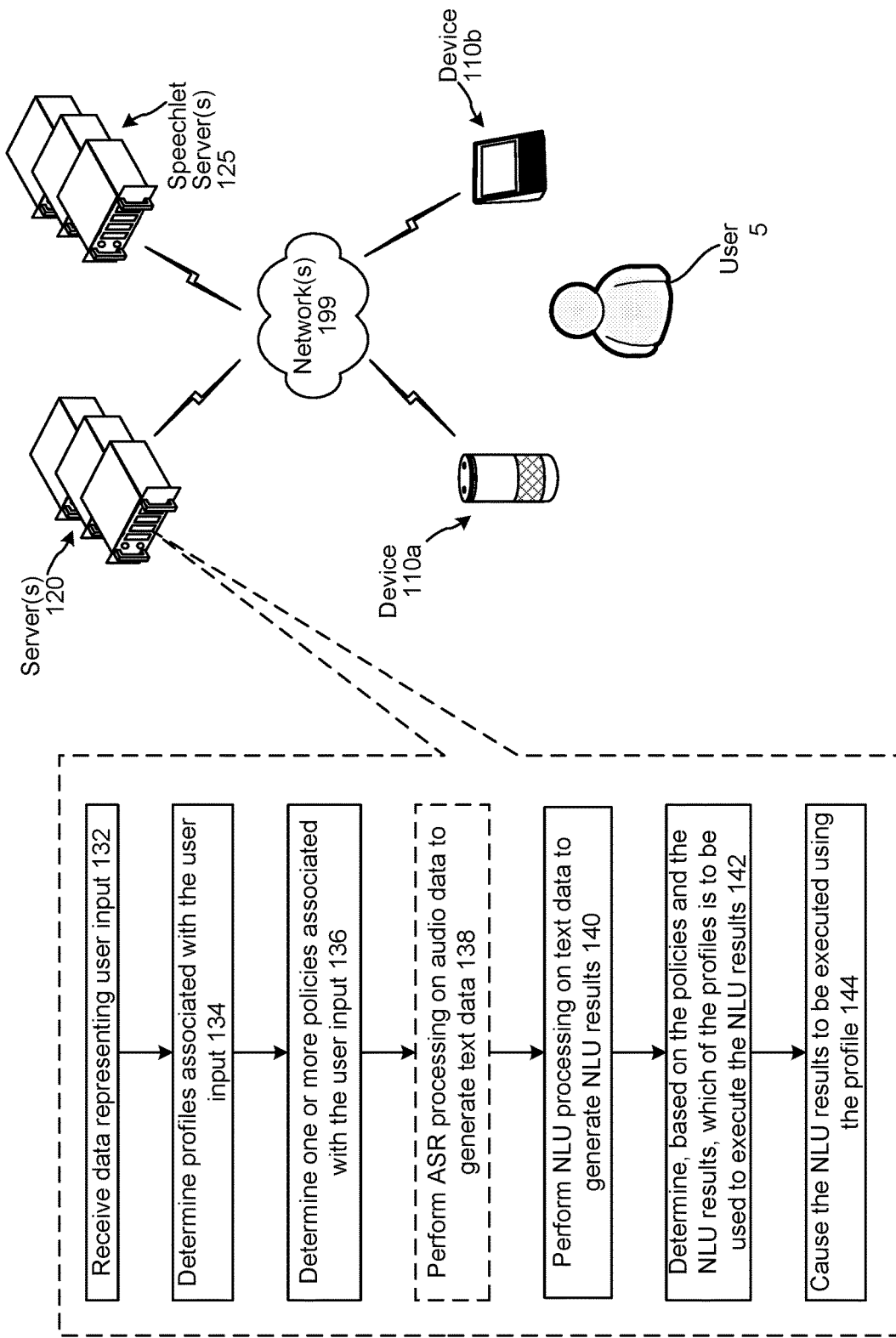
FIG. 1 illustrates a system configured to answer user inputs using desired profiles according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

Certain systems may be configured to perform actions responsive to user inputs. For example, a system may be configured to output weather information in response to a user input corresponding to "Alexa, what is the weather." For further example, a system may be configured to output music performed by Adele in response to a user input corresponding to "Alexa, play Adele music."

A system may be configured with personal and communal devices configured to perform the foregoing actions, as well as other actions. A personal device is one associated with a single user or a limited set of users, such as users of a household. A communal device is one located at a public location, such as a hotel room, conference room, etc.

A communal device may have a profile including settings specific to the communal device. For example, the profile of a communal device in a hotel room may include settings that enable a user to control the temperature of the hotel room using the communal device, control the hotel room's window drapes using the communal device, etc.

When a user uses a device in a communal location (for example is staying at a hotel room, is using a conference room, etc.), the user may cause their user profile to be associated with the communal device(s) of the communal location. That is, the user may cause the user's specific profile to become associated (though perhaps temporarily) with a device the user does not own. Alternatively, with user permission, when the user operates a communal device, the system may recognize the particular user operating the communal device and the system may temporarily cause the user's specific profile to become associated (though perhaps temporarily) with the communal device. This enables the user to input commands, to the communal device, that may be performed using settings of either the communal device's profile or the user's profile. Thus the user may ask a communal device to perform operations specific to the user (such as "play my favorite songs") and the system may properly interpret and execute the command based on the correct user and user profile.

In at least some instances, a given user input may be performed using either one of the communal device's profile or the user's profile. For example, if a user inputs "turn off the lights" to a hotel room's device, the system could turn off the lights of the hotel room using the hotel room device's profile or could turn off the lights of the user's house using the user's profile. For further example, if a user inputs "what events are on the calendar" to a hotel room's device, the system could determine events in an electronic calendar associated with the hotel room device's profile (which may include hotel events) or could determine events in an electronic calendar associated with the user's profile (which may include events specific to the user). In another example, if a user inputs "play music" to a hotel room's device, the system could output music of a playlist associated with the hotel room device's profile or could output music of a playlist associated with the user's profile.

Problems may arise if the system performs an action, responsive to a user input, using the wrong profile. For example, a user may be staying in a hotel room including a communal device. The user may say to the communal device "unlock the door." Since the communal device is associated with the communal device's profile and the user's profile, the system could perform two different actions. The system could unlock the hotel room's door or could unlock the user's house's door. Since the user is at the hotel, it could be problematic, and even dangerous, for the system to unlock the user's house's door if the user desired the hotel room's door be unlocked (and vice-versa).

The present disclosure provides techniques for disambiguating which profile to use for an input provided to a communal device. The techniques of the present disclosure enable a system to, with greater accuracy, perform an action using a correct profile.

A system implementing the present disclosure may require user permission to perform the teachings herein. That is, a system may require a user opt in, with informed consent, prior to the system being able to implement the teachings herein with respect to the user.

FIG. 1 illustrates a system configured to answer user inputs using desired profiles. Although the figures and discussion of the present disclosure illustrate certain operational steps of the system in a particular order, the steps described may be performed in a different order (as well as certain steps removed or added) without departing from the intent of the disclosure. One or more devices (110a/110b) local to a user 5, one or more servers 120, and one or more speechlet servers 125 may communicate across one or more networks 199.

Devices (110a/110b) may be referred to herein as communal devices. As used herein, a "communal device" is a device used by different users at different times. For example, a communal device 110 may be a device 110 located in a hotel unit (e.g., hotel room, suite of rooms, or other personalized space that user can gain temporary access to using an access card or other identifier), a rental property, a hospital room, a conference room, etc. For further example, a communal device may be a rental vehicle. If the communal device 110 is a rental vehicle, the policies for performing profile disambiguation described herein may be indexed in storage based on vehicle manufacturer.

The same device may at certain times be considered a communal device, at certain times be considered a semi-private device, and at certain times be considered a private device. For example, a property may function as a home of a family at some times and rental property at other times. Thus, the device would only function as a communal device, as described herein, when the property is functioning as a rental property. A device may become a communal device, for example, when the device becomes associated with a user profile of a user that is not traditionally associated with the device, when the device becomes associated with a profile of an organization (such as a hotel or rental organization), or in other situations.

The user 5 may provide the device 110a with speech representing a user input. The device 110a may receive the speech as audio using one or more microphones of the (or associated with) the device 110a and generate audio data representing the audio. The user may alternatively provide the device 110b with text (e.g., via a keyboard) representing the user input. The device 110b may generate text data representing the text. The device (110a/110b) may send data (e.g., the audio data or text data) to the server(s) 120, which the server(s) receives (132).

The server(s) 120 determines (134) the profiles associated with the user input. As described above, when a user uses a communal location (e.g., is staying at a hotel room, is using a conference room, etc.), the user may cause their user profile to be associated with the communal device(s) of the communal location. The communal device may additionally be associated with its own profile (described herein as a communal profile). The server(s) 120 may receive a device identifier of the device (110a/110b) that sent the data representing the user input to the server(s) 120. The server(s) 120 may determine profiles (or profile identifiers) associated with the device identifier.

The system may link a user profile to a device's profile with user consent. For example, the user 5 may provide an input to the device 110 and the system may not be able to perform an action responsive to the user input using the device's profile. In response, the system may cause the device 110 to display text or output synthesized speech indicating the system could not execute the user input without user permission to associate the user's profile with the device. The text and/or synthesized speech may also solicit that permission. For example, the system may solicit the user 5 to provide their phone number or other system identifier. In response to the system receiving the user's identifier (which the user may input as text or speech), the system may associate a user profile (associated with the user's identifier) to the device 110. In particular, the system may associate the user's identifier with an identifier of the device 110 or the device's profile's identifier.

In some examples, the system may be configured to cause a personal device of the user 5 to output the content and solicit the user's identifying information. For example, the system may communicate with a short message service (SMS) associated with the user's personal device to send a message representing the content and request for information to the user's personal device. The system may also cause a companion application (implemented by the user's personal device and that communicates with the server(s) 120) to output a notification and/or message representing the content and request for information. The user 5 may provide the requested information by sending a responsive SMS message or be responding using the companion application.

The server(s) 120 determines (136) one or more policies associated with the user input. The one or more policies may correspond to rules for disambiguating which profile is to be used by the system to execute a user input.

The server(s) 120 may determine one or more policies associated with the device identifier of the device (110a/110b). In some instances, the device identifier may be associated with a location identifier. A location identifier may correspond to a location in which the device (110a/110b) is located, such as a hotel unit (e.g., a hotel room, suite of rooms, or other personalized space that an access key gains a user entrance to), a rental property, a hospital room, etc. The server(s) 120 may, in these situations, determine one or more policies associated with the location identifier and/or the device identifier (e.g., the general location may have one or more policies applicable to all devices associated with the location while the device may have one or more policies applicable to that device but not other devices of the location).

If the server(s) 120 received audio data at step 132, the server(s) 120 may perform (138) ASR processing on the audio data to generate text data. The server(s) 120 performs (140) NLU processing on text data (either received at step 132 or generated at step 138) to generate NLU results.

The server(s) 120 determines (142), based on the one or more policies and the NLU results, which of the profiles, determined at step 134, is to be used to execute the NLU results. The server(s) 120 then causes (144) the NLU results to be executed using the determined profile.

Figure 2:
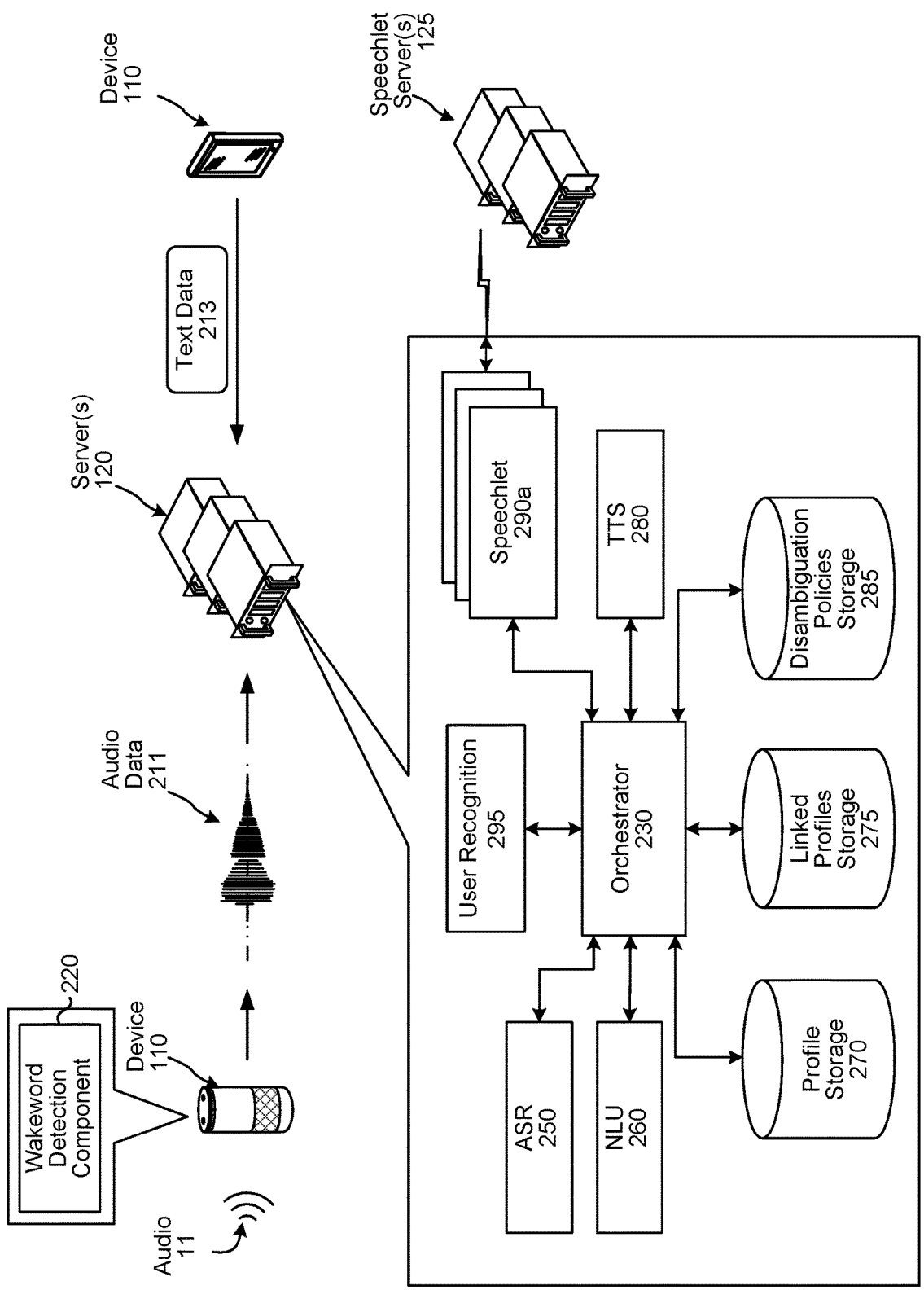
FIG. 2 is a conceptual diagram of components of a system according to embodiments of the present disclosure.

The system may operate using various components as described in FIG. 2. The various components may be located on same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. This process may also be referred to as keyword detection, with a wakeword being a specific example of a keyword. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the server(s) 120. The audio data 211 may include data corresponding to the wakeword, or the portion of the audio data 211 corresponding to the wakeword may be removed by the device 110 prior to sending the audio data 211 to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the audio data 211 to an ASR component 250. The ASR component 250 transcribes the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

Alternatively, the device 110 may send text data 213 to the server(s) 120. Upon receipt by the server(s) 120, the text data 213 may be sent to the orchestrator component 230. The orchestrator component 230 may send the text data 213 to the NLU component 260.

The NLU component 260 attempts to make a semantic interpretation of the phrase(s) or statement(s) represented in the text data input therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the server(s) 120, a speechlet component 290, the speechlet server(s) 125, etc.) to execute the intent. For example, if the text data corresponds to "play Adele music," the NLU component 260 may determine an intent that the system output music and may identify "Adele" as an artist. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 or the user 5.

The NLU results data may be sent from the NLU component 260 (which may include tagged text data, indicators of intent, etc.) a speechlet component(s) 290. If the NLU results data includes a single NLU hypothesis, the NLU component 260 may send the NLU results data to the speechlet component(s) 290 associated with the NLU hypothesis. If the NLU results data includes an N-best list of NLU hypotheses, the NLU component 260 may send the top scoring NLU hypothesis to a speechlet component(s) 290 associated with the top scoring NLU hypothesis.

A "speechlet component" may be software running on the server(s) 120 that is akin to a software application running on a traditional computing device. That is, a speechlet component 290 may enable the server(s) 120 to execute specific functionality in order to provide data or produce some other requested output. The server(s) 120 may be configured with more than one speechlet component 290. For example, a weather service speechlet component may enable the server(s) 120 to provide weather information, a car service speechlet component may enable the server(s) 120 to book a trip with respect to a taxi or ride sharing service, an restaurant speechlet component may enable the server(s) 120 to order a pizza with respect to the restaurant's online ordering system, etc. A speechlet component 290 may operate in conjunction between the server(s) 120 and other devices such as a device 110 in order to complete certain functions. Inputs to a speechlet component 290 may come from speech processing interactions or through other interactions or input sources.

A speechlet component 290 may include hardware, software, firmware, or the like that may be dedicated to a particular speechlet component 290 or shared among different speechlet components 290. A speechlet component 290 may be part of the server(s) 120 (as illustrated in FIG. 2) or may be located at whole (or in part) with one or more separate speechlet servers 125. A speechlet server(s) 125 may communicate with a speechlet component(s) 290 within the server(s) 120 and/or directly with the orchestrator component 230 or with other components.

Unless expressly stated otherwise, reference to a speechlet, speechlet device, or speechlet component may include a speechlet component operated by the server(s) 120 (for example as speechlet 290) and/or speechlet component operated by the speechlet server(s) 125. Moreover, the functionality described herein as a speechlet or speechlet component may be referred to using many different terms, such as an action, bot, app, or the like.

A speechlet component 290 may be configured to perform one or more actions. An ability to perform such action(s) may sometimes be referred to as a "skill." That is, a skill may enable a speechlet component 290 to execute specific functionality in order to provide data or perform some other action requested by a user. A particular speechlet component 290 may be configured to execute more than one skill. For example, a weather service skill may enable a weather speechlet component to provide weather information to the server(s) 120, a car service skill may enable a car service speechlet component to book a trip with respect to a taxi or ride sharing service, an order pizza skill may enable a restaurant speechlet component to order a pizza with respect to a restaurant's online ordering system, etc.

Speechlet components 290 of the system may be configured to execute different types of skills. Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The server(s) 120 may include a TTS component 280 that generates audio data (e.g., synthesized speech) from text data using one or more different methods. Text data input to the TTS component 280 may come from a speechlet component 290, the orchestrator component 230, or another component of the system.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The server(s) 120 may include a user recognition component 295 that recognizes one or more users associated with data input to the system. The user recognition component 295 may take as input the audio data 211 and/or text data (output by the ASR component 250 or received from the device 110). The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art. Output of the user recognition component 295 may include a single user identifier corresponding to the most likely user that originated the present user input. Alternatively, output of the user recognition component 295 may include an N-best list of user identifiers with respective scores indicating likelihoods of respective users originating the present user input. The output of the user recognition component 295 may be used to inform NLU processing as well as processing performed by other components of the system.

The server(s) 120 may include profile storage 270. The profile storage 270 may include a variety of information related to individual users, groups of users, devices, etc. that interact with the system. A "profile" refers to a set of data associated with a user, device, location, or other entity or location. The data of a profile may include preferences specific to the device, location, etc.; input and output capabilities of the device; internet connectivity information; user bibliographic information; subscription information, as well as other information.

The profile storage 270 may include one or more user profiles, with each user profile being associated with a different user identifier. Each user profile may include various user identifying information. Each user profile may also include preferences of the user and/or one or more device identifiers, representing one or more devices of the user.

A user profile may be associated with an individual user. Such a user profile may include preferences of the individual. Alternatively, a user profile may be associated with an establishment (e.g., a hotel, a rental property, etc.). Such a user profile may include preferences set for the establishment. A user profile associated with an establishment may be associated with more than one device located in the establishment. For example, a hotel user profile may be associated with various devices located in the hotel.

Information of a user profile may impact ASR and/or NLU processing. For example, the fact that a user profile represents enabled skills or other subscription services may impact ASR and/or NLU processing. For example, a user profile may be associated with various data such as a personalized lexicon, gazetteer, etc. that associates the user profile with certain content. For example, a user's music speechlet gazetteer might indicate what album titles, artist names, and song names are in a user's music collection. A user's contact list gazetteer might indicate what contacts are associated with the user, etc. Different speech processing components may use that information to properly interpret audio data in view of the user's particular data and/or settings in a manner to improve speech processing results with regard to a specific user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household. Moreover, each device profile may include information representing the speechlets 290 the device may be used to access.

The server(s) 120 may include linked profiles storage 275. The linked profiles storage 275 may include information representing linked profiles. Linked profiles in the linked profiles storage 275 may include user profiles, device profiles, etc. For example, a device identifier, associated with a device 110 located in a communal space (e.g., a hotel unit, rental property, hospital room, etc.), may be associated with a user identifier, associated with a user occupying the communal space. Illustrate linkages that may be represented in the linked profiles storage 275 are illustrated in FIG. 5.

The linked profiles in the linked profiles storage 275 may be dynamic. For example, when a user begins to occupy a communal space (e.g., a hotel unit, rental property, hospital room, etc.), the user's profile identifier may become associated with a device identifier(s) of a device(s) 110 located in the communal space. At the end of the user's occupation of the communal space (e.g., when the user checks out of the hotel, when the user's rental of the property is over, when the user is dispatched from the hospital, etc.), the system may delete the linkage of the user identifier and the device(s) identifier in the linked profiles storage 275. The foregoing linking and deletion of linkages by the system enables the system to limit a user's profile being used with respect to a communal device to instances when the user is occupying a communal space associated with the communal device.

The linked profiles storage 275 may associate, with linked profile identifiers, an indication of when the linkage should be deleted. The specificity of the indication of when the linkage should be deleted may vary (as illustrated in FIG. 5). In some instances, a deletion date may not be known and the indicator may be a null value. The indication may be generated based on user input. For example, when a user indicates the user wants its user profile to be associated with a device 110, the user may also indicate to the system when the user wants the linkage to be deleted. The indication may alternatively be generated based on information provided by a system associated with the device 110. For example, the device 110 may be associated with a booking system of a hotel, rental property, or the like. The booking system may provide the server(s) 120 with information representing when a user will no longer be occupying a communal space of the hotel, rental property, of the like. The server(s) 120 may represent such received data in association with a corresponding linkage of a device identifier and a user identifier in the linked profiles storage 275.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The server(s) 120 may include a disambiguation policies storage 285. The disambiguation policies storage 285 may include policies that represent which profile, of linked profiles in the linked profiles storage 275, is to be used to execute with respect to a particular user input. Each policy in the disambiguation policies storage 285 may be associated with a device identifier and/or communal location identifier. A "policy" stored in the disambiguation policies storage 285 and used by the system may be referred to as a policy, disambiguation policy, profile policy, or other like terminology.

A policy in the disambiguation policies storage 285 may be used to drive a user experience. For example, if a user inputs "Alexa, give me towels" to a device 110 located in a hotel unit, a policy in the disambiguation policies storage 285, associated with the device's identifier or the hotel unit's identifier, may represent the system is to perform an action responsive to the user input using the device's or hotel unit's identifier. For further example, if a user inputs "Alexa, get me toilet paper" to a device 110 located at a rental property, a policy in the disambiguation policies storage 285, associated with the device's identifier or the rental property's identifier, may represent the system is to perform an action responsive to the user input using the device's or rental property's identifier. Otherwise, the system may try to perform an action responsive to the user input using the user's identifier, which could result in an undesired user experience.

Policies in the disambiguation policies storage 285 may be associated with communal location types. For example, device identifiers, represented in the linked profiles storage 275, may be associated with communal location types such as hotel, rental property, hospital, etc. The system may be configured with policies that extend to two or more communal locations and devices associated a specific communal location type. For example, hotel rooms and their devices located at different hotels may be associated with the same one or more policies associated with hotels.

Policies in the disambiguation policies storage 285 may or may not be associated with intents that may be included in NLU results output by the NLU component 260. For example, intents that may be included in the NLU results include, but are not limited to <PlayMusic>, <Shopping>, <GetWeather>, etc. A user input corresponding to a particular intent may be executed using a user profile of the user that provided the user input or a user profile associated with the establishment in which the device 110 is located. For example, a <PlayMusic> intent may be executed using a playlist customized to a user profile of the user or may be executed using a playlist customized to a user profile of the establishment. In the foregoing example, a policy specific to the <PlayMusic> intent be successful at disambiguating which of the linked profiles to use. For example, a policy may state that a playlist customized to a user profile of the user is to be used when a <PlayMusic> intent is output by the NLU component 260.

Figure 3:
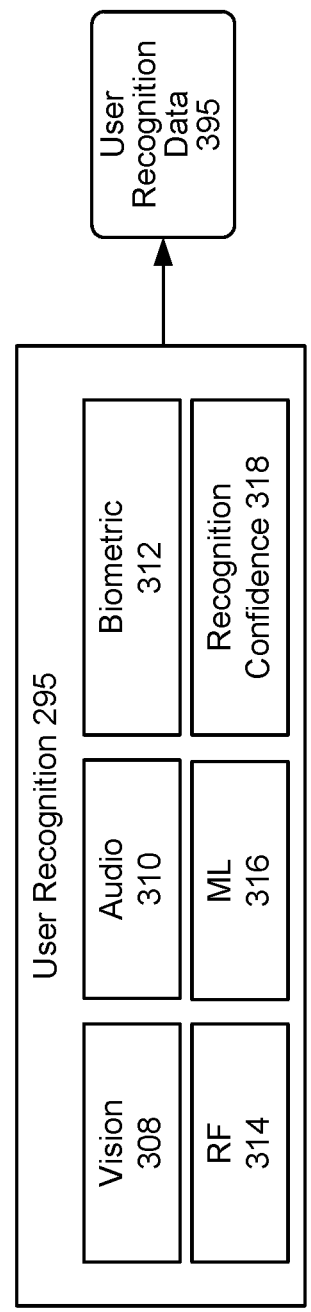
FIG. 3 is a schematic diagram of an illustrative architecture in which sensor data is combined to recognize one or more users according to embodiments of the present disclosure.

As detailed above, the server(s) 120 may include a user recognition component 295 that recognizes one or more users using a variety of data. As illustrated in FIG. 3, the user recognition component 295 may include one or more subcomponents including a vision component 308, an audio component 310, a biometric component 312, a radio frequency (RF) component 314, a machine learning (ML) component 316, and a recognition confidence component 318. In some instances, the user recognition component 295 may monitor data and determinations from one or more subcomponents to determine an identity of one or more users associated with data input to the system. The user recognition component 295 may output user recognition data 395, which may include a user identifier associated with a user the system believes is originating data input to the system. The user recognition data 395 may be used to inform processes performed by the orchestrator 230 (or a subcomponent thereof) as described below.

The vision component 308 may receive data from one or more sensors capable of providing images (e.g., cameras) or sensors indicating motion (e.g., motion sensors). The vision component 308 can perform facial recognition or image analysis to determine an identity of a user and to associate that identity with a user profile associated with the user. In some instances, when a user is facing a camera, the vision component 308 may perform facial recognition and identify the user with a high degree of confidence. In other instances, the vision component 308 may have a low degree of confidence of an identity of a user, and the user recognition component 295 may utilize determinations from additional components to determine an identity of a user. The vision component 308 can be used in conjunction with other components to determine an identity of a user. For example, the user recognition component 295 may use data from the vision component 308 with data from the audio component 310 to identify what user's face appears to be speaking at the same time audio is captured by a device 110 the user is facing for purposes of identifying a user who spoke an input to the system.

The system may include biometric sensors that transmit data to the biometric component 312. For example, the biometric component 312 may receive data corresponding to fingerprints, iris or retina scans, thermal scans, weights of users, a size of a user, pressure (e.g., within floor sensors), etc., and may determine a biometric profile corresponding to a user. The biometric component 312 may distinguish between a user and sound from a television, for example. Thus, the biometric component 312 may incorporate biometric information into a confidence level for determining an identity of a user. Biometric information output by the biometric component 312 can be associated with specific user profile data such that the biometric information uniquely identifies a user profile of a user.

The RF component 314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 314 the strength of the signal (e.g., as a received signal strength indication (RSSI)). The RF component 314 may use the RSSI to determine an identity of a user (with an associated confidence level). In some instances, the RF component 314 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system for purposes of the system determining who spoke a particular input. Such a registration may occur prior to, during, or after speaking of an input.

The ML component 316 may track the behavior of various users as a factor in determining a confidence level of the identity of the user. By way of example, a user may adhere to a regular schedule such that the user is at a first location during the day (e.g., at work or at school). In this example, the ML component 316 would factor in past behavior and/or trends into determining the identity of the user that provided input to the system. Thus, the ML component 316 may use historical data and/or usage patterns over time to increase or decrease a confidence level of an identity of a user.

In some instances, the recognition confidence component 318 receives determinations from the various components 308, 310, 312, 314, and 316, and may determine a final confidence level associated with the identity of a user. In some instances, the confidence level may determine whether an action is performed. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 395.

The audio component 310 may receive data from one or more sensors capable of providing an audio signal (e.g., one or more microphones) to facilitate recognizing a user. The audio component 310 may perform audio recognition on an audio signal to determine an identity of the user and associated user identifier. In some instances, aspects of the server(s) 120 may be configured at a computing device (e.g., a local server). Thus, in some instances, the audio component 310 operating on a computing device may analyze all sound to facilitate recognizing a user. In some instances, the audio component 310 may perform voice recognition to determine an identity of a user.

The audio component 310 may also perform user identification based on audio data 211 input into the system for speech processing. The audio component 310 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 310 may perform user recognition by comparing audio characteristics representing the audio data 211 to stored audio characteristics of users.

Figure 4:
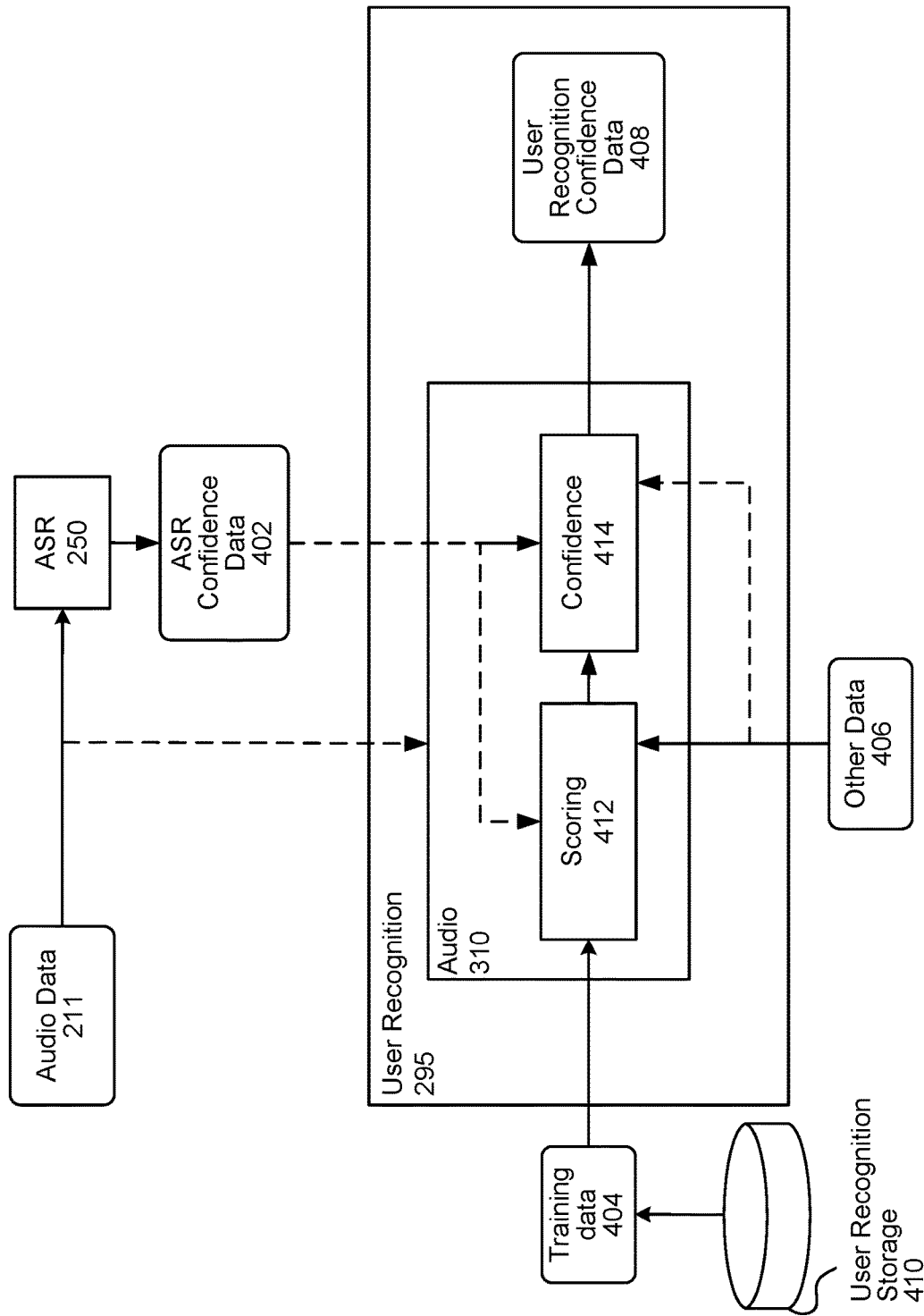
FIG. 4 is a system flow diagram illustrating user recognition processing according to embodiments of the present disclosure.

FIG. 4 illustrates the audio component 310 of the user recognition component 295 performing user recognition using audio data, for example the audio data 211. In addition to outputting text data as described above, the ASR component 250 may output ASR confidence data 402, which may be passed to the user recognition component 295. The audio component 310 performs user recognition using various data including the audio data 211, training data 404 corresponding to sample audio data corresponding to known users, the ASR confidence data 402, and other data 406. The audio component 310 may output user recognition confidence data 408 that reflects a certain confidence that the audio data 211 represents speech originating from one or more particular users. The user recognition confidence data 408 may include an indicator of a verified user (such as a user identifier corresponding to the speaker of the speech) along with a confidence value, such as a numeric value or binned value as discussed herein. The user recognition confidence data 408 may be used by various other components of the user recognition component 295 to recognize a user.

The training data 404 may be stored in a user recognition storage 410. The user recognition storage 410 may be included in the server(s) 120 or in communication with the server(s) 120, for example over the one or more networks 199. Further, the user recognition storage 410 may be part of the profile storage 270. The user recognition storage 410 may be a cloud-based storage.

The training data 404 stored in the user recognition storage 410 may be stored as waveforms and/or corresponding features/vectors. The training data 404 may correspond to data from various audio samples, each audio sample associated with a user identifier of a known user. The audio samples may correspond to voice profile data for one or more users. For example, each user known to the system may be associated with some set of training data 404. Thus, the training data 404 may include a biometric representation of a user's voice. The audio component 310 may use the training data 404 to compare against the audio data 211 to determine the identity of a user that spoke the speech represented in the audio data 211. The training data 404 stored in the user recognition storage 410 may thus be associated with multiple users of the system. The training data 404 stored in the user recognition storage 410 may also be associated with the device 110 that captured the respective speech.

To perform user recognition, the audio component 310 may determine the device 110 from which the audio data 211 originated. For example, the audio data 211 may be associated with a tag or other metadata indicating the device 110 (e.g., a device identifier). Either the device 110 or the server(s) 120 may tag the audio data 211 as such. The user recognition component 295 may send a signal to the user recognition storage 410, with the signal requesting only training data 404 associated with the device 110 (e.g., the device identifier) from which the audio data 211 originated. This may include determining user profile data including the device identifier and then only inputting (to the audio component 310) training data 404 associated with user identifiers corresponding to the user profile data. This limits the universe of possible training data 404 the audio component 310 should consider at runtime when recognizing a user and thus decreases the amount of time to perform user recognition by decreasing the amount of training data 404 needed to be processed. Alternatively, the user recognition component 295 may access all (or some other subset of) training data 404 available to the system.

If the audio component 310 receives training data 404 as an audio waveform, the audio component 310 may determine features/vectors of the waveform(s) or otherwise convert the waveform(s) into a data format (e.g., fingerprint) that can be used by the audio component 310 to actually perform user recognition. Likewise, if the audio component 310 receives the audio data 211 as an audio waveform, the audio component 310 may determine features/vectors of the waveform(s) or otherwise convert the waveform(s) into a fingerprint unique to the audio data 211. A fingerprint may be unique but irreversible such that a fingerprint is unique to underlying audio data but cannot be used to reproduce the underlying audio data. The audio component 310 may identify the user that spoke the speech represented in the audio data 211 by comparing features/vectors/fingerprint representing the audio data 211 to training features/vectors/fingerprints (either received from the user recognition storage 410 or determined from training data 404) received from the user recognition storage 410.

The audio component 310 may include a scoring component 412 that determines respective scores indicating whether the speech represented by the audio data 211 was spoken by particular users (represented by the training data 404). The audio component 310 may also include a confidence component 414 that determines an overall confidence of the user recognition operations (such as those of the scoring component 412) and/or an individual confidence for each user potentially identified by the scoring component 412. The output from the scoring component 412 may include scores for all users with respect to which user recognition was performed (e.g., all user identifiers associated with the device identifier associated with the audio data 211). For example, the output may include a first score for a first user identifier, a second score for a second user identifier, third score for a third user identifier, etc. Although illustrated as two separate components, the scoring component 412 and confidence component 414 may be combined into a single component or may be separated into more than two components.

The scoring component 412 and confidence component 414 may implement one or more trained machine learning models (such neural networks, classifiers, etc.) as known in the art. For example, the scoring component 412 may use probabilistic linear discriminant analysis (PLDA) techniques. PLDA scoring determines how likely it is that an audio data feature vector corresponds to a particular training data feature vector associated with a particular user identifier. The PLDA scoring may generate similarity scores for each training feature vector considered and may output the list of scores and user identifiers of the users whose training data feature vectors most closely correspond to the audio data feature vector. The scoring component 412 may also use other techniques such as GMMs, generative Bayesian models, or the like to determine similarity scores.

The confidence component 414 may input various data including the ASR confidence data 402, audio length (e.g., number of frames of the audio data 411), audio condition/ quality data (such as signal-to-interference data or other metric data), fingerprint data, image data, or other data to consider how confident the audio component 310 is with regard to the scores linking user identifiers to the audio data 211. The confidence component 414 may also consider the similarity scores and user identifiers output by the scoring component 412. Thus, the confidence component 414 may determine that a lower ASR confidence represented in the ASR confidence data 402, or poor input audio quality, or other factors, may result in a lower confidence of the audio component 310. Whereas a higher ASR confidence represented in the ASR confidence data 402, or better input audio quality, or other factors, may result in a higher confidence of the audio component 310. Precise determination of the confidence may depend on configuration and training of the confidence component 414 and the models used therein. The confidence component 414 may operate using a number of different machine learning models/techniques such as GMM, neural networks, etc. For example, the confidence component 414 may be a classifier configured to map a score output by the scoring component 412 to a confidence.

The audio component 310 may output user recognition confidence data 408 representing a single user identifier, or multiple user identifiers in the form of an N-best list. For example, the audio component 310 may output user recognition confidence data 408 representing each user identifier associated with the device identifier of the device 110 from which the audio data 211 originated.

The user recognition confidence data 408 may include particular scores (e.g., 0.0-1.0, 0-1000, or whatever scale the system is configured to operate). Thus, the system may output an N-best list of user identifiers with confidence scores (e.g., User identifier 1—0.2, User identifier 2—0.8). Alternatively or in addition, the user recognition confidence data 408 may include binned recognition indicators. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the system may output an N-best list of user identifiers with binned scores (e.g., User ID 1—low, User ID 2—high). Combined binned and confidence score outputs are also possible. Rather than a list of user identifiers and their respective scores and/or bins, the user recognition confidence data 408 may only include information related to the top scoring user identifier as determined by the audio component 310. The scores and bins may be based on information determined by the confidence component 414. The audio component 310 may also output a confidence value that the scores/bins are correct, where the confidence value indicates how confident the audio component 310 is in the user recognition confidence data 408. This confidence value may be determined by the confidence component 414.

The confidence component 414 may determine differences between confidence scores of different user identifiers when determining the user recognition confidence data 408. For example, if a difference between a first user identifier confidence score and a second user identifier confidence score is large, and the first user identifier confidence score is above a threshold, then the audio component 310 is able to recognize the first user identifier is associated with the audio data 211 with a much higher confidence than if the difference between the user identifier confidence scores were smaller.

The audio component 310 may perform certain thresholding to avoid incorrect user recognition confidence data 408 being output. For example, the audio component 310 may compare a confidence score output by the confidence component 414 to a confidence threshold. If the confidence score is not above the confidence threshold (for example, a confidence of "medium" or higher), the audio component 310 may not output user recognition confidence data 408, or may only include in that data 408 an indication that a user identifier could not be determined. Further, the audio component 310 may not output user recognition confidence data 408 until a threshold amount of audio data 211 is accumulated and processed. Thus, the audio component 310 may wait until a threshold amount of audio data 211 has been processed before outputting user recognition confidence data 408. The amount of received audio data 211 may also be considered by the confidence component 414.

The user recognition component 295 may combine data from components 308-318 to determine the identity of a particular user. As part of its audio-based user recognition operations, the audio component 310 may use other data 406 to inform user recognition processing. A trained model or other component of the audio component 310 may be trained to take other data 406 as an input feature when performing recognition. The other data 406 may include a wide variety of data types depending on system configuration and may be made available from other sensors, devices, or storage such as user profile data, etc. The other data 406 may include a time of day at which the audio data 211 was captured, a day of a week in which the audio data 211 was captured, the text data output by the ASR component 250, NLU results data, and/or other data.

In one example, the other data 406 may include image data or video data. For example, facial recognition may be performed on image data or video data associated with the received audio data 211 (e.g., received contemporaneously with the audio data 211). Facial recognition may be performed by the vision component 308, or by another component of the server(s) 120. The output of the facial recognition process may be used by the audio component 310. That is, facial recognition output data may be used in conjunction with the comparison of the features/vectors of the audio data 211 and training data 404 to perform more accurate user recognition.

The other data 406 may also include location data of the device 110. The location data may be specific to a building within which the device 110 is located. For example, if the device 110 is located in user A's bedroom, such location may increase a user recognition confidence associated with user A's user identifier, while decreasing a user recognition confidence associated with user B's user identifier.

The other data 406 may also include data related to the profile of the device 110. For example, the other data 406 may further include type data indicating a type of the device 110. The type of device may be indicated in the profile associated with the device 110. For example, if the device 110 from which the audio data 211 was received is a communal device, the system may use information about the location of the device 110 to cross-check other potential user locating information (such as calendar data, etc.) to potentially narrow the potential user identifiers with respect to which user recognition is to be performed.

The other data 406 may additionally include geographic coordinate data associated with the device 110. For example, profile data associated with a vehicle may indicate multiple user identifiers. The vehicle may include a global positioning system (GPS) indicating latitude and longitude coordinates of the vehicle when the audio data 211 is captured by the vehicle. As such, if the vehicle is located at a coordinate corresponding to a work location/building of user A, such may increase a user recognition confidence associated with user A's user identifier, while decreasing a user recognition confidence of all other user identifiers indicated in the profile data associated with the vehicle. Global coordinates and associated locations (e.g., work, home, etc.) may be indicated in user profile data associated with the device 110. The global coordinates and associated locations may be associated with respective user identifiers in the profile storage 270.

The other data 406 may also include other data/signals about activity of a particular user that may be useful in performing user recognition with respect to the audio data 211. For example, if a user has recently used their access card, code, etc. to gain access to a communal space, and the speech was received from a device 110 associated with the communal space, signals from the card reader, access code received, etc. about the accessing user, time of access, etc. may be reflected in the other data 406 and considered by the audio component 310. If a mobile device (such as a phone, Tile, dongle, or other device) known to be associated with a particular user is detected proximate to (for example physically close to, connected to the same WiFi network as, or otherwise nearby) the device 110, this may be reflected in the other data 406 and considered by the audio component 310.

The user recognition confidence data 408 output by the audio component 310 may be used by other components of the user recognition component 295 and/or may be sent to one or more speechlet components 290, the orchestrator component 230, or to other components of the system.

Figure 6:
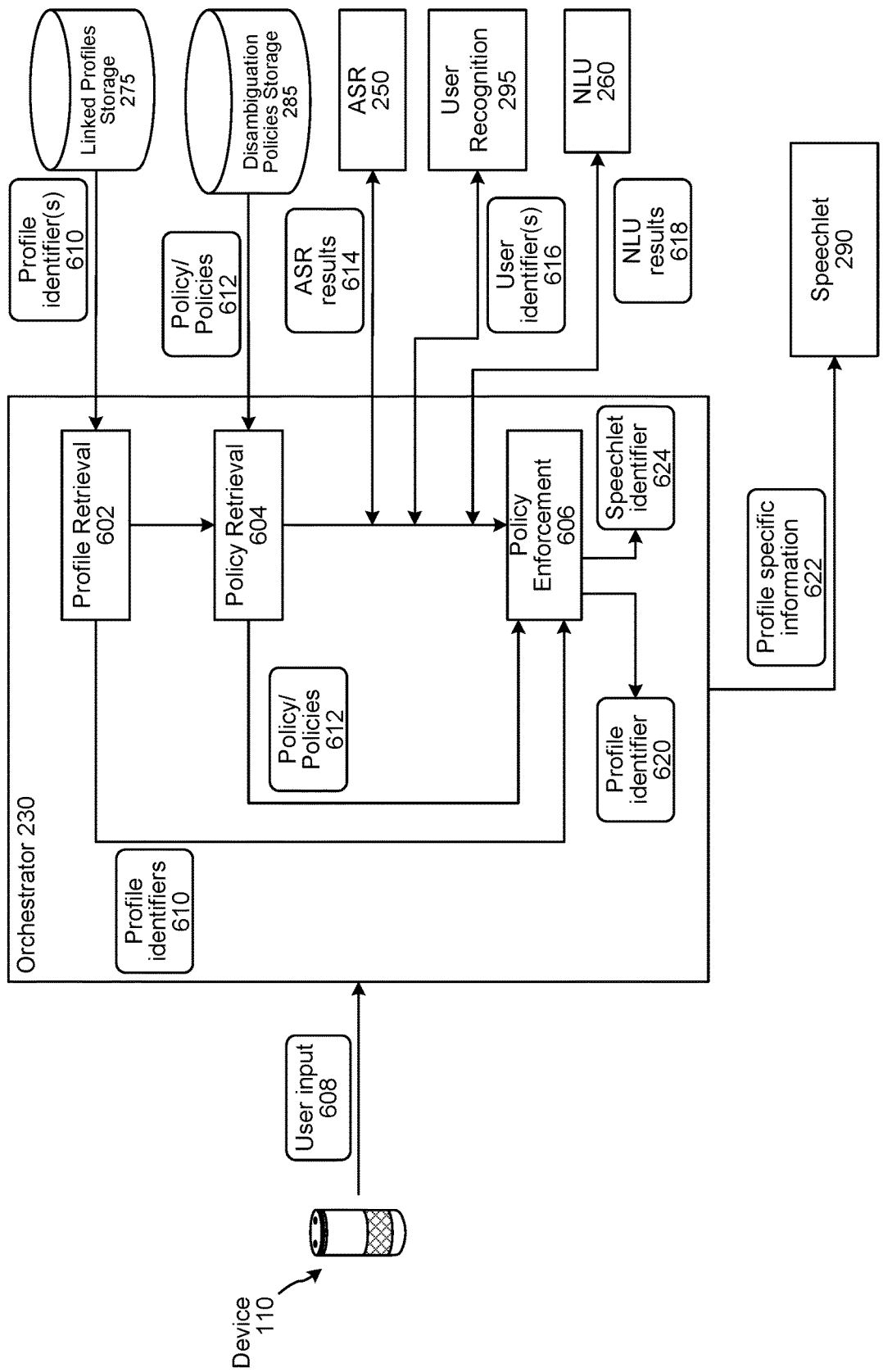
FIG. 6 is a conceptual diagram illustrating how a system, implementing a single policy enforcement component, may determine which linked profile to use to execute a user input according to embodiments of the present disclosure.

FIG. 6 illustrates how the system, implementing a single policy enforcement component, may determine which linked profile to use to execute a user input. The device 110 sends data 608 representing a user input to the orchestrator component 230. The data 608 may be audio data representing speech or may be text data representing text input to the device 110, for example via a traditional or virtual keyboard.

The orchestrator component 230 includes a profile retrieval component 602. The profile retrieval component 602 communicates with the linked profiles storage 275. In association with receiving the data 608 representing the user input, the orchestrator component 230 may also receive a device identifier associated with the device 110. The profile retrieval component 602 may determine one or more profile identifiers 610 associated with the device identifier in the linked profiles storage 275. Such determination results in the profile retrieval component 602 determining the different profiles that may be used to execute the user input.

The orchestrator component 230 may be configured with more than one profile retrieval component. An additional profile retrieval component may determine a list of user identifiers representing users that potentially originated the user input.

The orchestrator component 230 also includes a policy retrieval component 604. The policy retrieval component 604 communicates with the disambiguation policies storage 285. The policy retrieval component 604 determines one or more policies 612 associated with the device identifier, of the device 110, represented in the disambiguation policies storage 285. In addition to a policy 612 representing how to determine which profile to use, the policy 612 may also represent which speechlet component 290 should be invoked to execute with respect to the user input.

In some instances, as described above, a device identifier may be associated with a location identifier. In these situations, the policy retrieval component 604 may determine or on more policies associated with the location identifier in addition to or alternatively from determining one or more policies associated with the device identifier.

If the data 608 representing the user input is audio data, the orchestrator component 230 may send the audio data to the ASR component 250. Thereafter, the orchestrator component 230 may receive ASR results data 614 from the ASR component 250.

The orchestrator component 230, in some instances, may send the audio data (corresponding to data 608) and/or the ASR results data 614 to the user recognition component 295. The user recognition component 295 may consider the audio data, ASR results data, login data, biometric data, and/or other data to determine one or more user identifiers 616. The orchestrator component 230 may receive the one or more user identifiers 616 from the user recognition component 295.

The orchestrator component 230 may send the ASR results data 614 to the NLU component 260. Thereafter, the orchestrator component 230 may receive NLU results data 618 from the NLU component 260.

The orchestrator component 230 may include a policy enforcement component 606. The policy enforcement component 606 using the profile identifiers 610, the policy/policies 612, the NLU results data 618, and the user identifier(s) 616 to determine which profile of the profile identifiers 610 is to be used to execute the user input.

By the time the policy enforcement component 606 is invoked, the system knows information about the profiles associated with the user input, the policy/policies associated with the user input, the output of NLU processing, etc. The policy enforcement component 606 may include logic that is applied to disambiguate which profile should be used to perform an action responsive to the user input. The policy enforcement component 606 may determine a single policy, of multiple retrieved policies 612, are relevant for determining which profile is to be used to perform an action responsive to the user input. Alternatively, the policy enforcement component 606 may determine multiple policies, of the retrieved policies 612, are relevant for determining which profile is to be used to perform an action responsive to the user input. The policy enforcement component 606 considers all known information when determining which profile is to be used.

The policy enforcement component 606 may determine whether a policy represents only one profile (either the device's profile or the user's profile) is to be used. If a policy represents only the device's profile or the user's profile should be used, the policy enforcement component 606 may determine that profile is to be used.

The policy enforcement component 606 may also determine whether a policy represents a user's profile should be used if a speechlet component 290, configured to perform an action responsive to the user input (e.g., associated with a top scoring NLU hypothesis in the NLU results data 618), is configured to consider user specific information when determining a response to a user input. If the speechlet component 290 is configured to consider user specific information, the policy enforcement component 606 may determine the user's profile is to be used to perform an action responsive to the user input.

If the retrieved policies 612 do not include policies indicating one profile is to be used or indicating a user profile is to be used when the speechlet component 290 is configured to considered user specific information, the policy enforcement component 606 may query a speechlet component(s) 290, configured to execute with respect to the top scoring NLU hypothesis of the NLU results data 618, to determine if the speechlet component 290 can execute using either of the user profiles associated with the device 110. For example, if the user inputs "turn of the lights" to a device in a hotel room, the policy enforcement component 606 may query a smart home speechlet component to determine if the smart home speechlet component can execute using the user's profile, and may query the smart home automation speechlet component to determine if the smart home automation speechlet component can execute using the device's profile. If the queried speechlet component 290 is able to perform the same type of action using either of the user profiles (e.g., is able to turn off the hotel room's light using the user profile of the hotel or is able to turn off the user's home lights using the user profile of the user, according to the above example), the policy enforcement component 606 may choose either of the profiles to be used to perform an action responsive to the user input. If the queried speechlet component 290 is not able to perform the action in an equivalent manner (e.g., the speechlet component 290 is able to play music without commercials using the user's profile but is only able to play music with commercials using the device's profile), the policy enforcement component 606 may perform further profile disambiguation as described below.

If the user has disambiguated profiles with respect to a previous user input (e.g., the user previously chose the device's profile to be used, instead of the user's profile, with respect to the user input of "turn off the lights"), the policy enforcement component 606 may choose the previously user-selected profile to be used to perform an action responsive to the current user input.

If the user has not previously disambiguated which profile to use with respect to the same type of user input as the present user input (e.g., the previous user input is "turn off the lights" and the present user input of "turn off lights" may be considered the same type of user input because they are requesting the same action be performed), the policy enforcement component 606 may weigh which profile to select based on one or more of the following factors. The policy enforcement component 606 considers as many of the foregoing parameters when ranking the profiles to determine which profile to select to be used by downstream components.

The policy enforcement component 606 may rank which profile to use based on location. An action to be performed using the device's profile may be performed at one location and an action to be performed using the user's profile may be performed at another location. For example, if the user inputs "turn off the lights" to a communal space's device 110, the system may turn off the communal space's lights using the device's profile and may turn of the user's home's lights using the user's profile. The policy enforcement component 606 may rank the profile that results in the action being performed that is closest to the device 110. In the foregoing example, the policy enforcement component 606 may rank the device's profile higher than the user's profile because the communal space's lights are closer to the device 110 than the user's home's lights.

The policy enforcement component 606 may rank which profile to use based on time. An action to be performed using the device's profile may be performed at one time and an action to be performed using the user's profile may be performed at another time. For example, if the user inputs "what's on the calendar" to a communal space's device 110, an electronic calendar associated with the device's profile may include a next upcoming event at a first time and an electronic calendar associated with the user's profile may include a next upcoming event at a second time. The policy enforcement component 606 may rank the profile, which results in an action occurring sooner, higher than the profile that results in an action occurring later. In the foregoing example, the policy enforcement component 606 may rank the profile resulting in the output of information relating to the soonest to happen event (e.g., one starting in the next 30 minutes instead of the event starting in the next 45 minutes) higher than the profile resulting in the output of information relating to an event commencing further in the future.

The policy enforcement component 606 may rank which profile to use based on frequency of action. A user may frequently ask the system to perform an action personalized to the user profile (e.g., play music from a playlist associated with the user profile). If the user inputs "play music" to a communal space's device 110, the policy enforcement component 606 may rank the user's profile higher than the device's profile because the user invokes the user's playlist more frequently than the user invokes the device's user-agnostic playlist.

The policy enforcement component 606 may rank which profile to use based on past event information. An event may have recently occurred that relates to the user's use of the device 110 in a communal space. For example, the user may have recently checked out from a hotel room using a mobile application but the system may not yet have updated the linked profiles storage 275. If the remains in the hotel room after the user checks out and inputs "add water to the shopping list" to the hotel room's device 110, the policy enforcement component 606 may rank the user's profile higher than the device's profile because it is likely the user wants the water added to their personalized shopping list (and not a room service list associated with the device 110) since they recently checked out of the hotel room.

The policy enforcement component 606 may rank which profile to use based on profile update requirements and/or content interruptions. In response to a user inputting "play music" to a communal space's device, the system may be configured to play music using the device's profile but may only be configured to play the same music if the user profile is updated to be associated with a pay-for service, or play the same music with commercials using the present user profile's settings. The policy enforcement component 606 may rank the profile allowing for an action to be performed with the updating of a profile or without commercials over a profile that would need to be updated or that would require commercials be output.

The policy enforcement component 606 may rank which profile to use based on cost. In response to a user input, the system may be configured to perform an action using the device's profile that costs a first amount and perform an action using the user's profile that costs a second amount. The policy enforcement component 606 may rank the profile resulting in the cheaper action higher than the profile resulting in the more expensive action.

Ultimately, the policy enforcement component 606 may output a profile identifier 620, representing one of the profile identifiers 610, and speechlet component identifier 624 associated with a speechlet component 290 that should be invoked to perform an action responsive to the user input.

The orchestrator component 230 may cause the device 110 to output content representing the selected profile. In some instances the orchestrator component 230 may also cause the device 110 to request the user indicate whether the selected profile is correct. Such outputs may be represented as "I am going to turn off the hotel room's lights rather than your lights, is this correct." The output content may be displayed text or output audio corresponding to synthesized speech generated by the TTS component 280. If the user provides an input (e.g., speech or text) representing the selected profile is correct, the orchestrator component 230 may send, to a speechlet component 290 configured to perform an action using the top scoring NLU hypothesis of the NLU results data 618, information 622 specific to the selected profile and that is permitted (e.g., based on previous user permission) to be shared with the speechlet component 290. may perform an action using the selected profile. If the user provides an input (e.g., speech or text) representing the selected profile is incorrect, the orchestrator component 230 may determine the unselected profile, of the profile identifiers 610, and may send, to the speechlet component 290, information 622 specific to the unselected profile and that is permitted to be shared with the speechlet component 290.

The system may include traditional user profile fields that are sent to speechlet components 290. If the selected profile is the user profile of the establishment within which the device 110 is located, the system may populate the traditional fields with that user profile's information. In contrast, if the selected profile is the user profile of the user that provided the user input, the system may populate the traditional fields with that user profile's information.

Alternatively, the system may generate new metadata including information of the establishment's user profile and send the metadata as a new attribute in a serial peripheral interface (SPI). The metadata may include the fields of the traditional data sent to speechlet components 290. Thus, some of the fields of the metadata may be null since some of the traditional user profile fields may not be applicable to the device's profile. The speechlet component 290 that receives the metadata may select either the user profile data or the metadata to execute with respect to the user input. This option gives the speechlet component 290 control over which profile information to use. The foregoing example may be implemented by a speechlet specific policy enforcement component 706, described with respect to FIG. 7 below.

Prior to sending the profile specific information 622 to the speechlet component 290, the orchestrator component 230 may send an indicator of the selected profile to the speechlet component 290. The indicator may represent whether the selected profile is a profile of the user that provided the user input or a profile of the establishment within which the device 110 is located.

When the policy enforcement component 606 is finished ranking the profiles, each profile may be associated with a respective confidence value representing the policy enforcement component's confidence that the profile associated with the confidence value should be selected to be used to perform an action responsive to the user input. In some instances, the policy enforcement component 606 may be unsuccessful in disambiguating which profile to use. For example, after ranking the profiles, a difference between confidence values of the profiles may not satisfy a threshold difference. A confidence value may be a binned value (e.g., high, medium, low) or may be a numeric value (e.g., in scale of 0 to 1, or some other scale). When this occurs, the orchestrator component 230 may cause the device 110 to output content representing the possible profiles that may be used to perform an action responsive to the user input. For example, in response to the user inputting "play music" to a hotel room's device 110, the orchestrator component 230 may cause the device 110 to output content corresponding to "should I play music using your personalized playlist or the playlist of the hotel." The output content may be displayed text or output audio corresponding to synthesized speech generated by the TTS component 280. The user may provide further input (e.g., speech or text) representing which profile to use. The orchestrator component 230 may then send information 622 specific to the user indicated profile to the speechlet component 290.

In some implementations, order of processing may be important. For example, it may be beneficial for the profile retrieval component 602 to process prior to the policy retrieval component 604 and it may be beneficial for the policy retrieval component 604 to process prior to the ASR component 250. In other implementations, order of processing may be less important. For example, it may be beneficial for the profile retrieval component 602 to process prior to the policy retrieval component 604 and the ASR component 250, but the policy retrieval component 604 and the ASR component 250 may be permitted to process at least partially in parallel. In another example, the system may be configured to have the policy retrieval component 604 perform at least partially in parallel to the NLU component 260. As such, one skilled in the art will appreciate that components of the system may operate at least partially in parallel.

In view of the description with respect to FIG. 6, one skilled in the art will appreciate that the system's processing pipeline for disambiguating which profile to use to execute a user input is scenario agnostic. That is, the same processing pipeline may be used when the device 110 is located in a hotel unit, is located at a rental property, is located in a hospital room, is located in a conference room, is a rental vehicle, etc.

Described above is an example processing pipeline including a single policy enforcement component 606. A system may alternatively be configured with more than one policy enforcement component 606. Each policy enforcement component 606 may receive different data because different data may be available at different points in the processing pipeline where the different policy enforcement component 606 are implemented. Moreover, each policy enforcement component 606 may process with respect to one or more different policies than another policy enforcement component 606. A policy enforcement component 606 may process with respect to only one or more policies needed to invoked a downstream process of the processing pipeline or component of the system.

As illustrated in FIG. 6, the policy enforcement component 606 may be implemented as part of the orchestrator component 230. One skilled in the art will appreciated that some or all of the policy enforcement components 606 of the system may be implemented outside of the orchestrator component 230 without departing from the present disclosure.

Figure 7:
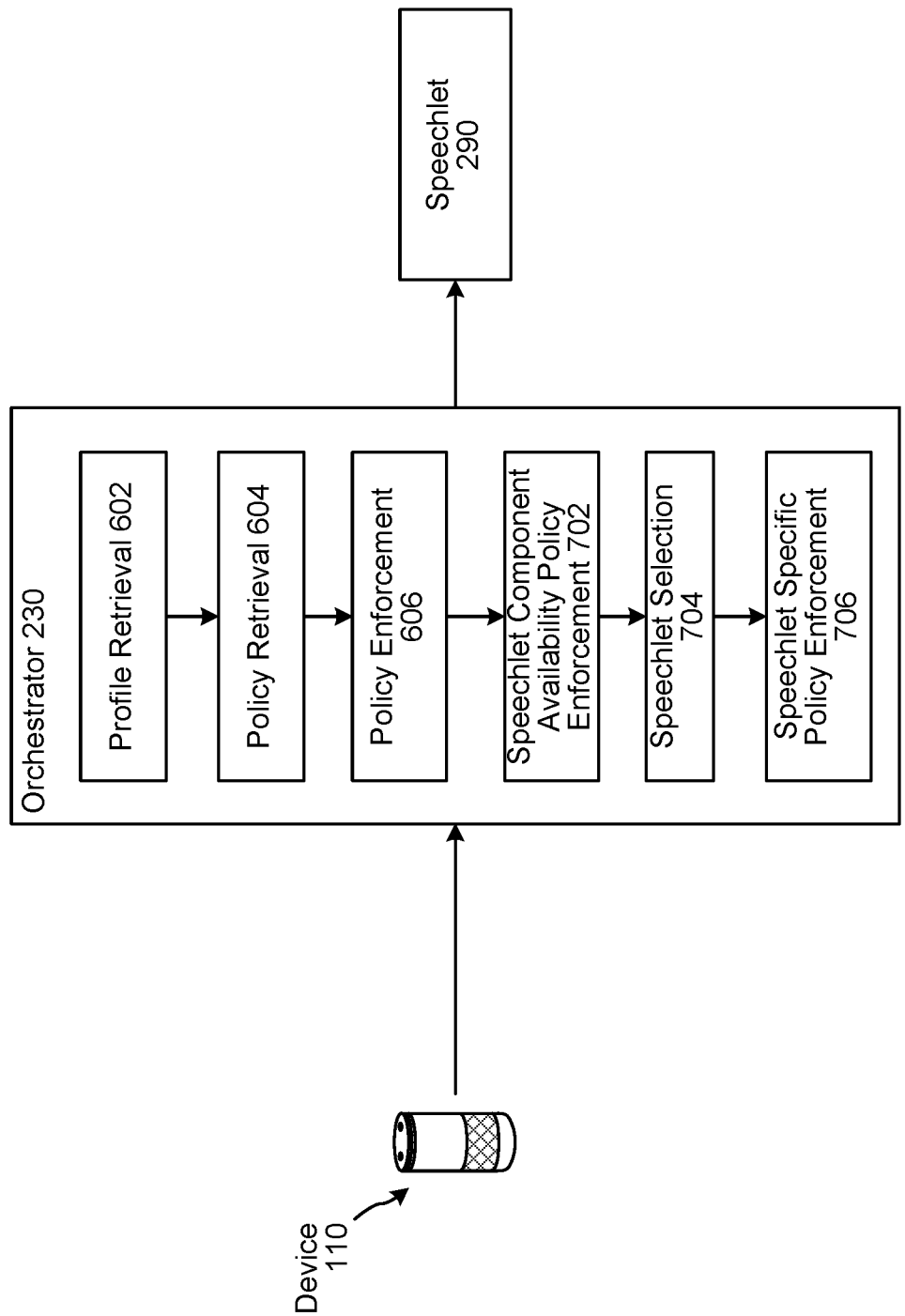
FIG. 7 is a conceptual diagram illustrating how a system, implementing multiple policy enforcement components, may determine which linked profile to use to execute a user input according to embodiments of the present disclosure.

FIG. 7 is a conceptual diagram illustrating how a system, implementing multiple policy enforcement components, may determine which linked profile to use to execute a user input. One skilled in the art will appreciate that the system of FIG. 7 may include various aspects of the system of FIG. 6 even though the below description of FIG. 7 is limited to differences between the systems of FIGS. 6 and 7.

Various speechlet components 290 may be configured to execute with respect to the top scoring NLU hypothesis in the NLU results data 618. The orchestrator component 230 may implement speechlet component availability policy enforcement component 702 that determines which of the potential speechlet components 290 are available to execute with respect to the top scoring NLU hypothesis and the determine profile.

The orchestrator component 230 may implement a speechlet selection component 704 that receive one or more speechlet component identifiers output by the speechlet component availability policy enforcement component 702. The speechlet selection component 704 may consider the one or more speechlet component identifiers, as well as other information, to select a particular speechlet component 290 to be invoked to execute with respect to the user input.

The orchestrator component 230 may implement a speechlet specific policy enforcement component 706. The speechlet specific policy enforcement component 706 may be invoked after the speechlet selection component 704 is finished selecting the speechlet component 290, but prior to the top scoring NLU hypothesis being sent to the speechlet component 290. The speechlet specific policy enforcement component 706 may implement one or more policies specific to the selected speechlet component 290. The one or more policies may instruct the system that the speechlet component 290 requires certain profile information to execute. In an example, a policy may indicate the speechlet component 290 should not be invoked unless a confidence value representing a user originated the user input satisfies a threshold confidence value. If the confidence value does not satisfy the threshold confidence value, the system may cause the user recognition component 295 to perform further processing, as described herein, in an attempt to raise the confidence value until it satisfies the threshold confidence value. Alternatively, if the policy/policies of the selected speechlet component 290 are not satisfied, the speechlet selection component may select a different speechlet component 290 to execute with respect to the user input and the speechlet specific policy enforcement component 706 may execute with respect to the other speechlet component's policy/policies.

All policies implemented by the different policy enforcement components of the system may be stored in the same database, or may be stored in respective databases. A policy enforcement component cause relevant policies to be retrieved. That is, if more than one policy enforcement component is implemented, the policies implemented by each policy enforcement component need not be retrieved from storage at the same time. Such would limit a policy enforcement component to retrieve policies based on information that was not available when other policies were previously retrieved.

Figure 8:
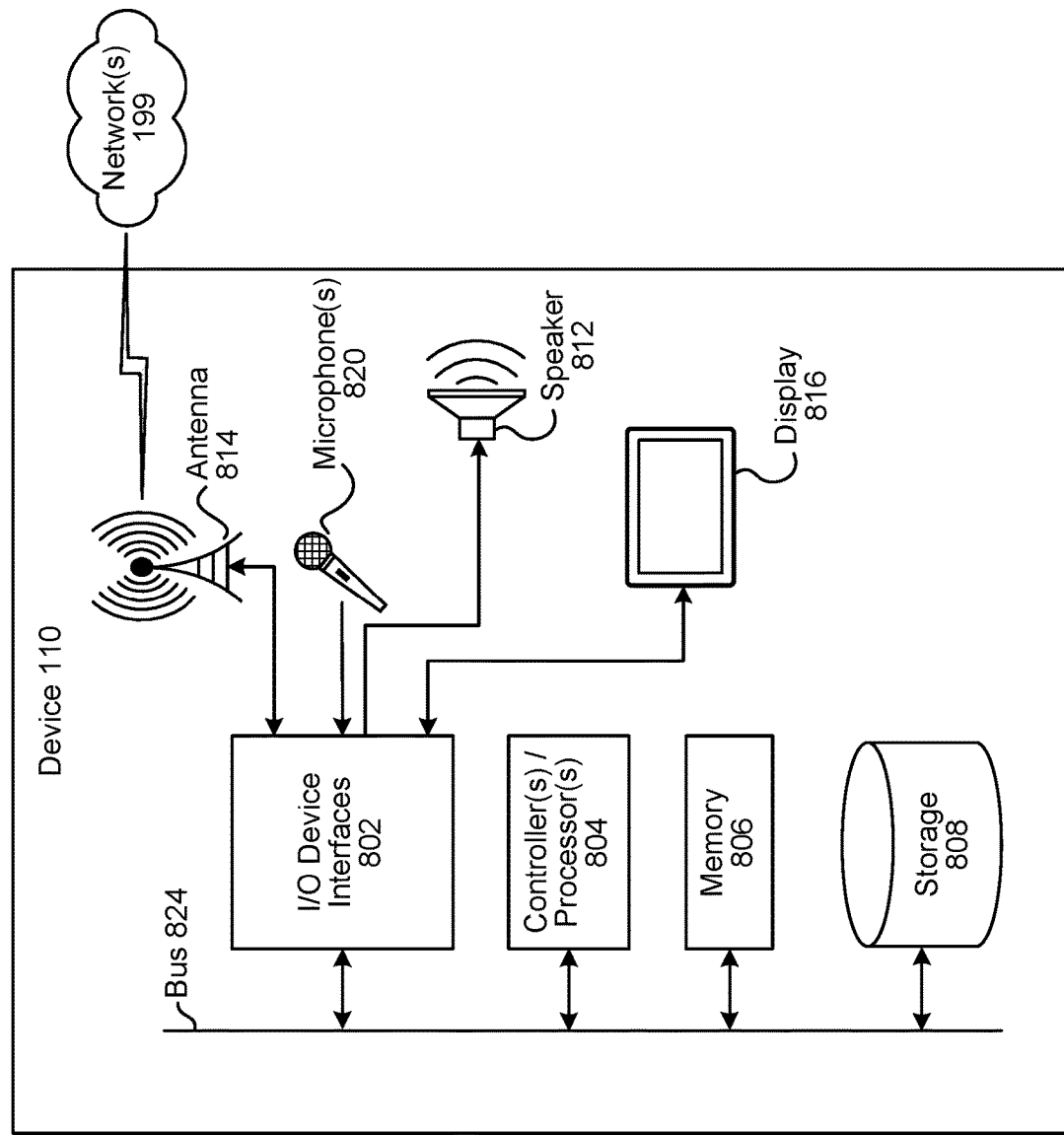
FIG. 8 is a block diagram conceptually illustrating example components of a device according to embodiments of the present disclosure.
Figure 9:
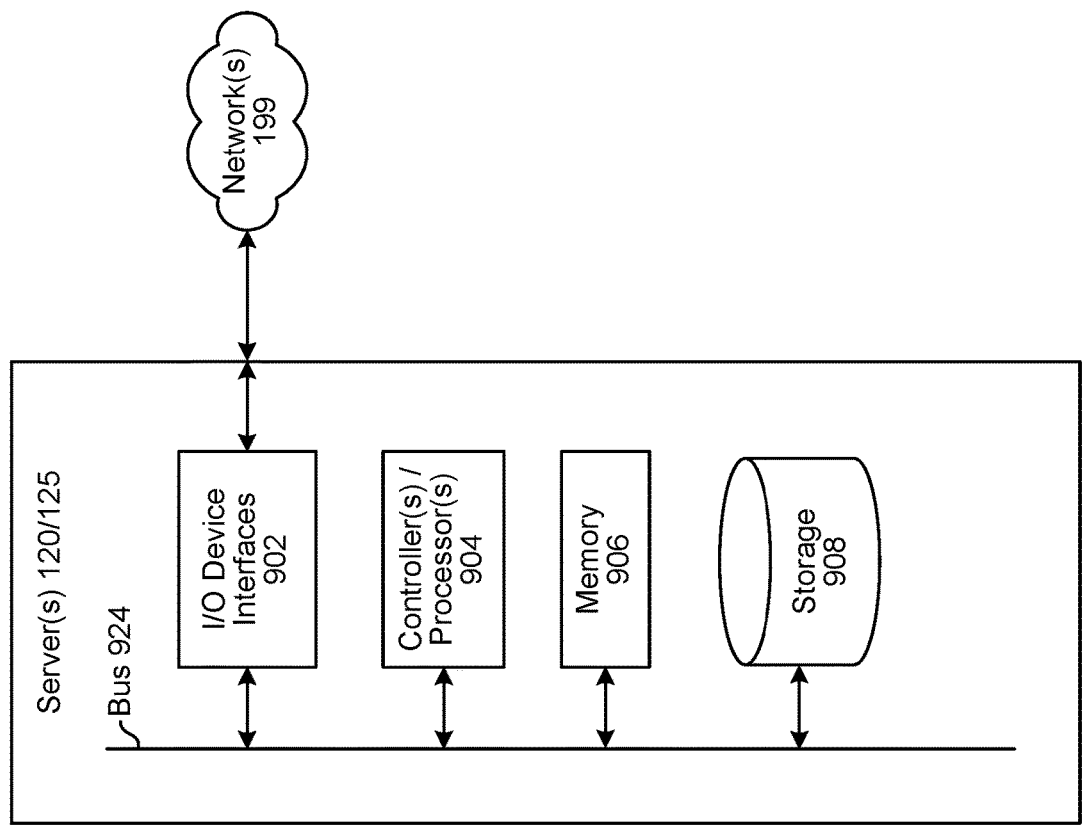
FIG. 9 is a block diagram conceptually illustrating example components of a server according to embodiments of the present disclosure.

FIG. 8 is a block diagram conceptually illustrating a device 110 that may be used with the system. FIG. 9 is a block diagram conceptually illustrating example components of a remote device, such as the server(s) 120, which may assist with ASR processing, NLU processing, etc., and the speechlet server(s) 125. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/125) may be included in the system, such as one or more servers 120 for performing ASR processing, one or more servers 120 for performing NLU processing, one or more speechlet server(s) 125 for performing actions responsive to user inputs, etc. In operation, each of these devices (or groups of devices) may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the server(s) 120, or the speechlet server(s) 125 may include their own dedicated processors, memory, and/or storage. Alternatively, one or more of the components of the device(s) 110, the server(s) 120, or the speechlet server(s) 125 may utilize the I/O interfaces (802/902), processor(s) (804/904), memory (806/906), and/or storage (808/908) of the device(s) 110 server(s) 120, or the speechlet server(s) 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the server(s) 120, and the speechlet server(s) 125, as described herein, are illustrative, and may be located as a stand-alone device or may be included, in whole or in part, as a component of a larger device or system.

Figure 10:
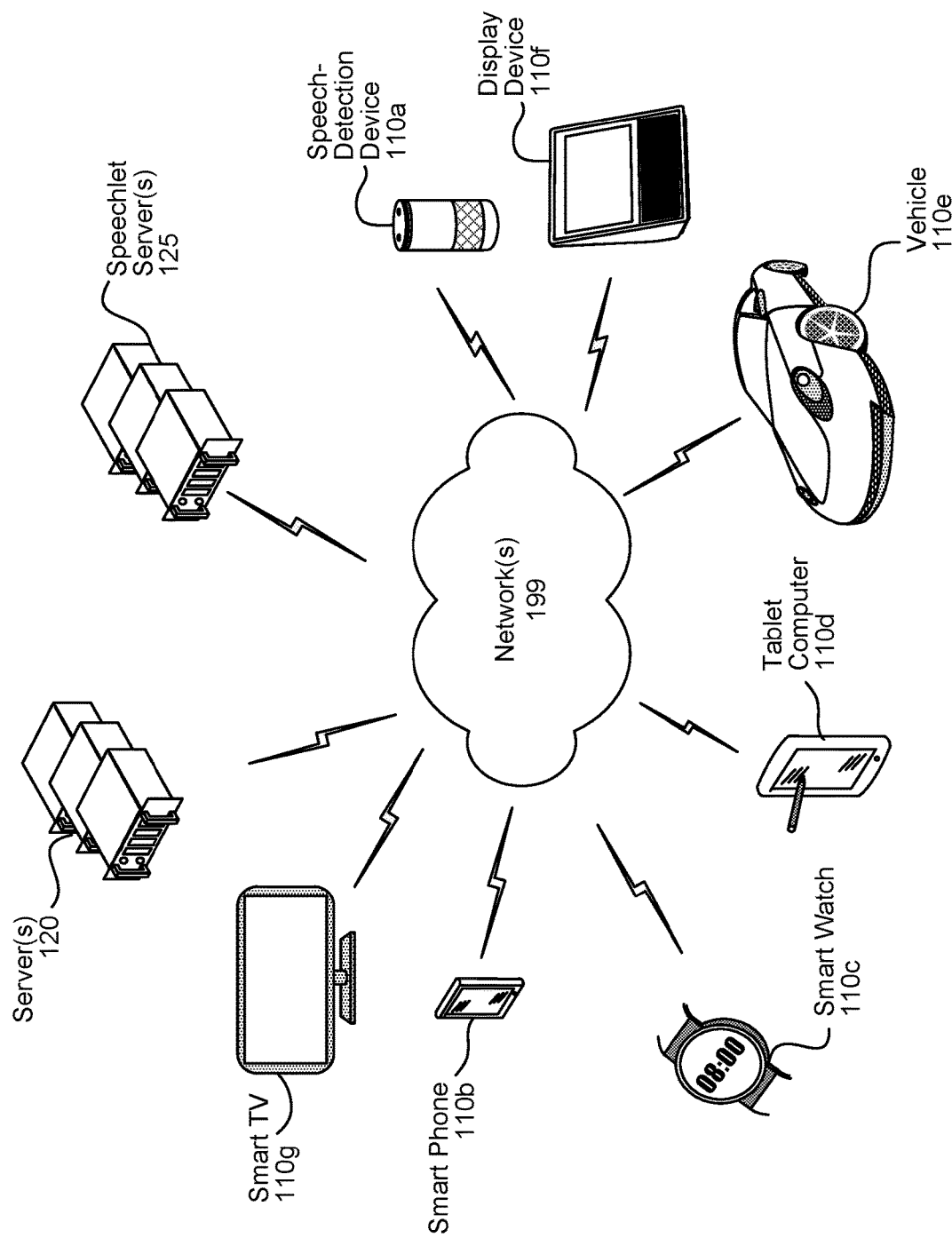
FIG. 10 illustrates an example of a computer network for use with the speech processing system.

As illustrated in FIG. 10, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the speechlet server (s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
   identifying a device associated with a first user profile, the first user profile being associated with an establishment within which the device is located;
   associating a second user profile with the device, resulting in the device being associated with the first user profile and the second user profile;
   receiving, from the device and after associating the second user profile with the device, audio data representing speech from a user;
   determining, after receiving the audio data, the first user profile;
   determining the second user profile is associated with the user;
   determining first policy data associated with the device, the first policy data indicating at least:
      the first user profile is to be used to perform a first action corresponding to a first intent, and
      the second user profile is to be used to perform a second action corresponding to a second intent;
   performing automatic speech recognition (ASR) processing on the audio data to generate text data;
   determining, using natural language understanding (NLU) processing, that the text data corresponds to the first intent;
   determining, based at least in part on the first policy data and the text data corresponding to the first intent, that the first user profile is to be used to perform the first action;
   determining a first component to perform the first action;
   sending, to the first component, a first indicator to perform the first action;
   sending, to the first component, information specific to the first user profile;
   receiving, from the first component, a second indicator that the first action was performed, the first action being responsive to the speech; and
   causing the device to output content representing the first action was performed.

2. The method of claim 1, further comprising:
   determining a first confidence value representing a correspondence between audio characteristics of the audio data and stored audio characteristics associated with a user identifier;
   after determining the first component, determining second policy data specific to the first component, the second policy data representing the user identifier is to be sent to the first component when the user identifier is associated with a confidence value satisfying a threshold confidence value;
   determining the first confidence value satisfies the threshold confidence value; and
   sending, prior to receiving the first indicator, the user identifier to the first component.

3. The method of claim 1, further comprising:
   sending, to the first component, a first instruction to indicate whether the first component is configured to perform the first action using the first user profile;
   receiving, from the first component, a second indicator representing the first component is configured to perform the first action using the first user profile;
   sending, to the first component, a second instruction to indicate whether the first component is configured to perform the first action using the second user profile;
   receiving, from the first component, a third indicator representing the first component is unable to perform the first action using the second user profile; and
   determining, based at least in part on the second indicator and third indicator, that the first user profile is to be used to perform the first action.

4. The method of claim 1, further comprising:
   determining previous NLU results data representing a previous input associated with the first user profile and the second user profile;
   determining a previous instruction to execute the previous NLU results data using the first user profile; and
   determining, based at least in part on the previous instruction, that the first user profile is to be used to perform the first action responsive to the speech.

5. A method, comprising:
   receiving, from a device, first data representing a first input from a user;
   determining a first user profile associated with the device, the first user profile being associated with an establishment within which the device is located;
   determining a second user profile associated with the device, the second user profile being associated with the user;
   determining first policy data associated with the device, the policy data indicating at least:
      the first user profile is to be used to perform a first action corresponding to a first intent, and
      the second user profile is to be used to perform a second action corresponding to a second intent;
   determining, using natural language understanding (NLU) processing, that the first input corresponds to the first intent;
   determining, based at least in part on the first policy data and the first input corresponding to the first intent, that the first user profile is to be used to perform the first action; and
   causing a first component to perform the first action using information specific to the first user profile.

6. The method of claim 5, further comprising:
   determining a first confidence value representing the first data is associated with a first user identifier;
   determining the first component is configured to perform the first action;
   after determining the first component, determining second policy data specific to the first component, the second policy data representing a user identifier is to be sent to the first component when the user identifier is associated with a confidence value satisfying a threshold confidence value;
   determining the first confidence value satisfies the threshold confidence value; and
   sending the first user identifier to the first component.

7. The method of claim 5, further comprising:
   sending, to the first component, an instruction to indicate whether the first component is configured to perform the first action using the first user profile;
   receiving, from the first component, a first indicator representing the first component is configured to perform the first action using the first user profile;
   sending, to the first component, an instruction to indicate whether the first component is configured to perform the first action using the second user profile;

receiving from the first component, a second indicator representing the first component is unable to perform the first action using the second user profile; and causing, based at least in part on the first indicator and second indicator, the first component to perform the first action using the information specific to the first user profile.

8. The method of claim 5, further comprising:

determining previous NLU results data representing a previous user input associated with the first user profile and the second user profile;

determining a previous user instruction to execute the previous NLU results data using the first user profile; and causing, based at least in part on the previous user instruction, the first component to perform the first action using the information specific to the first user profile.

9. The method of claim 5, wherein the first data is audio data and wherein the method further comprises:

performing automatic speech recognition (ASR) processing on the audio data to generate text data; and performing NLU processing on the text data to determine that the first input corresponds to the first intent, wherein:

determining the first user profile and the second user profile occurs prior to determining the first policy data; and determining the first policy data occurs at least partially in parallel to at least one of the ASR processing or the NLU processing.

10. The method of claim 5, further comprising:

determining the device is associated with a location identifier, the location identifier representing a communal location where the device is located; and determining the first policy data based at least in part on the location identifier.

11. The method of claim 5, further comprising:

determining the first component is configured to cause the first action to be performed at a first location using the first user profile, the first location being a first distance away from the device;

determining the first component is configured to cause the second action to be performed at a second location using the second user profile, the second location being a second distance away from the device;

determining the first distance is less than the second distance; and causing, based at least in part on the first distance being less than the second distance, the first component to perform the first action using the information specific to the first user profile.

12. The method of claim 5, further comprising:

receiving, from the device, second data representing a second input from the user;

determining, using natural language understanding (NLU) processing, that the second input corresponds to the second intent;

determining, based at least in part on the first policy data and the second input corresponding to the second intent, that the second user profile is to be used to perform the second action; and causing a second component to perform the second action using information specific to the second user profile.

13. The method of claim 12, further comprising:

receiving, from the device, third data representing a third input from the user;

determining, using natural language understanding (NLU) processing, that the third input corresponds to the second intent;

determining the second action is unable to be performed using the first user profile;

causing the device to output first content representing the second action is unable to be performed using the first user profile;

causing the device to output second content requesting an identifier associated with the user;

receiving, from the device, fourth data representing the identifier;

determining the identifier is associated with the second user profile; and associating the second user profile with the device, wherein the second data is received after associating the second user profile with the device.

14. A computing system, comprising:

at least one processor; and at least one memory comprising instructions that, when executed by the at least one processor, cause the computing system to:

receive, from a device, first data representing a first input from a user;

determine a first user profile associated with the device, the first user profile being associated with an establishment within which the device is located;

determine a second user profile associated with the device, the second user profile being associated with the user;

determine first policy data associated with the device, the first policy data indicating at least:

the first user profile is to be used to perform a first action corresponding to a first intent, and the second user profile is to be used to perform a second action corresponding to a second intent;

determine, using natural language understanding (NLU) processing, that the first input corresponds to the first intent;

determine, based at least in part on the first policy data and the first input corresponding to the first intent, that the first user profile is to be used to perform the first action; and cause a first component to perform the first action using information specific to the first user profile.

15. The computing system of claim 14, wherein the at least one memory further comprises additional instructions that, when executed by the at least one processor, further cause the computing system to:

determine a first confidence value representing the first data is associated with a first user identifier;

determine the first component is configured to perform the first action;

after determining the first component, determine second policy data specific to the first component, the second policy data representing a user identifier is to be sent to the first component when the user identifier is associated with a confidence value satisfying a threshold confidence value;

determine the first confidence value satisfies the threshold confidence value; and send the first user identifier to the first component.

16. The computing system of claim 14, wherein the at least one memory further comprises additional instructions that, when executed by the at least one processor, further cause the computing system to:

send, to the first component, a first instruction to indicate whether the first component is configured to perform the first action using the first user profile;

receive, from the first component, a first indicator representing the first component is configured to perform the first action using the first user profile;

send, to the first component, a second instruction to indicate whether the first component is configured to perform the first action using the second user profile;

receive from the first component, a second indicator representing the first component is unable to perform the first action using the second user profile; and cause, based at least in part on the first indicator and the second indicator, the first component to perform the first action using the information specific to the first user profile.

17. The computing system of claim 14, wherein the at least one memory further comprises additional instructions that, when executed by the at least one processor, further cause the computing system to:

determine previous NLU results data representing a previous user input associated with the first user profile and the second user profile;

determine a previous user instruction to execute the previous NLU results data using the first user profile; and cause, based at least in part on the previous user instruction, the first component to perform the first action using the information specific to the first user profile.

18. The computing system of claim 14, wherein the first data is audio data and wherein the at least one memory further comprises additional instructions that, when executed by the at least one processor, further cause the computing system to:

perform automatic speech recognition (ASR) processing on the audio data to generate text data; and perform NLU processing on the text data to determine that the first input corresponds to the first intent, wherein:

determining the first user profile and the second user profile occurs prior to determining the first policy data; and determining the first policy data occurs at least partially in parallel to at least one of the ASR processing or the NLU processing.

19. The computing system of claim 14, wherein the at least one memory further comprises additional instructions that, when executed by the at least one processor, further cause the computing system to:

determine the device is associated with a location identifier, the location identifier representing a communal location where the device is located; and determine the first policy data based at least in part on the location identifier.

20. The computing system of claim 14, wherein the at least one memory further comprises additional instructions that, when executed by the at least one processor, further cause the computing system to:

determine the first component is configured to cause the first action to be performed at a first location using the first user profile, the first location being a first distance away from the device;

determine the first component is configured to cause the second action to be performed at a second location using the second user profile, the second location being a second distance away from the device;

determine the first distance is less than the second distance; and cause, based at least in part on the first distance being less than the second distance, the first component to perform the first action using the information specific to the first user profile.

21. The computing system of claim 14, wherein the at least one memory further comprises additional instructions that, when executed by the at least one processor, further cause the computing system to:

receive, from the device, second data representing a second input from the user;

determine, using natural language understanding (NLU) processing, that the second input corresponds to the second intent;

determine, based at least in part on the first policy data and the second input corresponding to the second intent, that the second user profile is to be used to perform the second action; and cause a second component to perform the second action using information specific to the second user profile.

* * * * *